US012807537B2

(12) United States Patent
Min et al.

(10) Patent No.: US 12,807,537 B2
(45) Date of Patent: Nov. 24, 2026

(54) SINTERED BODY AND COMPONENT PART INCLUDING SAME

(71) Applicant: Solmics Co., Ltd., Pyeongtaek-si (KR)

(72) Inventors: Kyung yeol Min, Seoul (KR); Yongsoo Choi, Seoul (KR); SungSic Hwang, Seoul (KR); Kyung In Kim, Seoul (KR); Jung Kun Kang, Seoul (KR); Su Man Chae, Seoul (KR)

(73) Assignee: Solmics Co., Ltd., Pyeongtaek-si (KR)

( * ) Notice: Subject to any disclaimer, the term of this patent is extended or adjusted under 35 U.S.C. 154(b) by 410 days.

(21) Appl. No.: 18/508,446

(22) Filed: Nov. 14, 2023

(65) Prior Publication Data

US 2024/0158304 A1 May 16, 2024

(30) Foreign Application Priority Data

Nov. 15, 2022 (KR) ........................ 10-2022-0152866

(51) Int. Cl.
*C04B 35/563* (2006.01)
*C04B 35/626* (2006.01)
*C04B 35/64* (2006.01)

(52) U.S. Cl.
CPC ...... *C04B 35/563* (2013.01); *C04B 35/62655* (2013.01); *C04B 35/64* (2013.01); *C04B 2235/3821* (2013.01); *C04B 2235/656* (2013.01); *C04B 2235/661* (2013.01); *C04B 2235/786* (2013.01); *C04B 2235/9607* (2013.01); *C04B 2235/9669* (2013.01)

(58) Field of Classification Search
None
See application file for complete search history.

(56) References Cited

U.S. PATENT DOCUMENTS

| | | | |
|---|---|---|---|
| 2007/0182073 A1 | 8/2007 | Speyer et al. | |
| 2008/0063583 A1 | 3/2008 | Hirao et al. | |
| 2008/0227618 A1 * | 9/2008 | Horiuchi | C04B 35/6455 501/87 |
| 2020/0051793 A1 | 2/2020 | Hwang et al. | |
| 2020/0062654 A1 * | 2/2020 | Hwang | C04B 35/6261 |

FOREIGN PATENT DOCUMENTS

| | | | |
|---|---|---|---|
| CN | 103613389 | A | 3/2014 |
| CN | 108675793 | A | 10/2018 |
| CN | 110818422 | A | 2/2020 |
| CN | 115175885 | A | 10/2022 |
| EP | 1 761 474 | B1 | 12/2009 |
| EP | 3 611 753 | A1 | 2/2020 |
| EP | 3 614 415 | A1 | 2/2020 |
| EP | 4 082 992 | A1 | 11/2022 |
| JP | 2004-196590 | A | 7/2004 |
| JP | 2008-133160 | A | 6/2008 |
| JP | 2020-73420 | A | 5/2020 |
| JP | 2021-151949 | A | 9/2021 |
| KR | 10-2011-0018997 | A | 2/2011 |
| KR | 10-1557908 | B1 | 10/2015 |
| KR | 10-2020-0019068 | A | 2/2020 |
| KR | 10-2262340 | B1 | 6/2021 |
| KR | 10-2021-0103382 | A | 8/2021 |
| KR | 10-2364295 | B1 | 2/2022 |
| TW | 202135127 | A | 9/2021 |
| WO | WO 2021/162422 | A1 | 8/2021 |
| WO | WO 2021/162424 | A1 | 8/2021 |

* cited by examiner

*Primary Examiner* — Mohammad M Ameen
(74) *Attorney, Agent, or Firm* — NSIP Law

(57) ABSTRACT

The sintered body includes boron carbide, wherein a volume ratio of grains of the boron carbide having a grain size greater than 1 μm and less than or equal to 4 μm is 61% to 86% based on a volume ratio of total grains on a surface of the sintered body.

11 Claims, 11 Drawing Sheets
(4 of 11 Drawing Sheet(s) Filed in Color)

SINTERED BODY AND COMPONENT PART INCLUDING SAME

CROSS-REFERENCE TO RELATED APPLICATION

This application claims the benefit under 35 USC § 119(a) of Korean Patent Application No. 2022-0152866, filed on Nov. 15, 2022, the disclosure of which is incorporated herein by reference in its entirety.

BACKGROUND

1. Field of the Invention

The present disclosure relates to a sintered body with improved plasma etch resistance and a component part, which includes the sintered body, for a plasma processing apparatus.

2. Discussion of Related Art

A plasma processing apparatus includes an upper electrode and a lower electrode, which are disposed in a chamber, a semiconductor wafer, a glass substrate, or the like, which is placed on the lower electrode. The plasma processing apparatus is operated by supplying power between the upper electrode and the lower electrode. Plasma of a processing gas is generated by electrons, which are accelerated by an electric field between the upper electrode and the lower electrode or are emitted from the upper electrode and the lower electrode, or are heated and ionically colliding with molecules of the processing gas. Active species such as radicals or ions in the plasma may allow desired microprocessing, e.g., an etching process, to be performed on a surface of an object to be etched.

Manufacturing designs of electronic devices and the like are becoming more elaborated, and particularly, higher dimensional precision is required and significantly high power is used in plasma etching. Such plasma processing apparatus includes a built-in focus ring that is affected by plasma.

An increase in plasma power may result in a wavelength effect, in which standing waves are formed, a skin effect, in which an electric field is concentrated at the center of the electrode surface, or the like. Accordingly, the plasma distribution may generally be maximized at the center of an object to be etched and minimized at the edges of the object, thereby deteriorating uniformity of the plasma distribution on a substrate and lowering the quality of the microelectronic devices.

Through a focus ring placed at the outside of an object to be etched, an effect of the focus ring may be exerted on the distribution of an electric field at the outside of the object and the non-uniformity of plasma distribution may be alleviated to some extent. However, an etch rate of the focus ring relative to a plasma processing time may be high and the plasma distribution may be influenced by the etching of the focus ring. Therefore, there is a need for a method of increasing the etching resistance and replacement cycle of the focus ring and improving process efficiency.

The above-described background is technical information that the inventor possessed or acquired for conceiving embodiments of the present disclosure, and cannot necessarily be a known technology disclosed to a general public prior to the filing of the present disclosure.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, the sintered body includes boron carbide, wherein a volume ratio of grains of the boron carbide having a grain size greater than 1 μm and less than or equal to 4 μm is 61% to 86% based on a total volume of grains on a surface of the sintered body.

A carbon content of the sintered body may be 18 wt % to 30 wt % based on a total weight of the sintered body according to an X-ray fluorescence analysis.

A porosity of the sintered body may be 5 vol % or less.

A volume ratio of grains of the boron carbide having a grain size of 1 μm or less may be in a range of 1.5% to 15% based on the total volume of grains on the surface of the sintered body.

A volume ratio of grains of the boron carbide having a grain size of greater than 4 μm may be in a range of 7.2% to 31% based on the total volume of grains on the surface of the sintered body.

The sintered body may have an average grain size of 2 μm to 5 μm.

A porosity of the sintered body may be 0.5 vol % or less.

A content of boron and carbon may be 97 wt % or more.

An etch rate of the sintered body according to Equation 1 below may be 2% or less under plasma etching conditions, where a pressure of a chamber is 100 mTorr, a plasma power is 800 W, a plasma exposure time is 300 minutes, a flow rate of $CF_4$ gas in the chamber is 50 sccm, a flow rate of Ar gas is 100 sccm, and a flow rate of 02 gas is 20 sccm:

Etch rate={(thickness of the sintered body before etching-thickness of the sintered body after etching)/(thickness of the sintered body after etching)}×100% [Equation 1]

The sintered body may have a thermal conductivity of 18 W/mK to 33 W/mK at 25° C.

In another general aspect, the method of preparing a sintered body includes: charging a raw material composition in a mold and molding the same and carbonizing the molded raw material at a temperature of 500° C. to 1000° C.; a first sintering of performing a first thermal process at a temperature of 1900° C. to 2100° C. after the carbonizing; and a second sintering of performing a second thermal process at a temperature of 2000° C. to 2230° C. after the first sintering.

The raw material composition may include boron carbide and a sintering enhancer.

The first sintering and the second sintering may be performed at a pressure of 25 MPa to 60 MPa, respectively.

The raw material composition may be raw material granules obtained by spray-drying a raw material slurry including boron carbide, a sintering enhancer, and a solvent.

In still another general aspect, the component part disposed inside a plasma processing apparatus includes the sintered body.

Other features and aspects will be apparent from the following detailed description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present disclosure will become more apparent to those of ordinary skill in the art by describing embodiments thereof in detail with reference to the accompanying drawings.

Figure 1A:
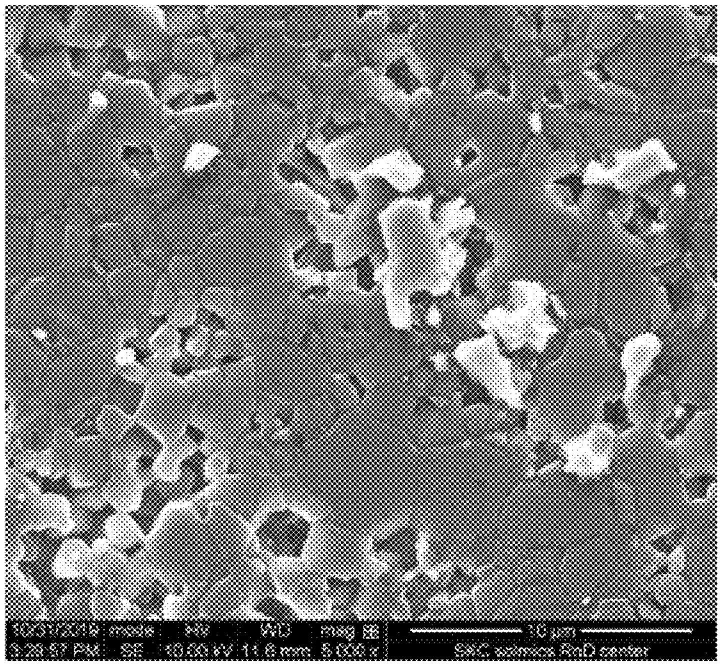
FIG. 1A illustrates a surface of the sintered body of Example 1 before electrolytic etching.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

Throughout the present disclosure, it will be understood that when an element is referred to as "including" or "comprising" another element, the element may further include or comprise other elements, rather than excluding other elements, unless mentioned otherwise.

Throughout the present disclosure, when an element is referred to as being "connected" to another element, it should be understood to mean that the element is "directly connected" to the other element or is "connected" to the other element with another element therebetween.

In the present disclosure, when B is referred to as being on A, it should be understood to mean that B is positioned on A in direct contact with A or with another layer therebetween and should not be understood to mean only that B is positioned on A in direct contact with A.

In the present disclosure, the term "a combination thereof" included in an expression of the Markush form refers to a mixture or combination of one or more elements selected from the group consisting of elements described in the Markush form and should be understood as at least one selected from the group consisting of the elements.

In the present disclosure, the expression "A and/or B" should be understood as "A," "B," or "A and B."

In the present disclosure, the terms such as "first" and "second" or "A" and "B" are used to distinguish one element from another unless otherwise described.

In the present disclosure, singular forms are intended to include plural forms as well, unless the context clearly indicates otherwise.

It is an object of the present disclosure to provide a sintered body that induces a substantially uniform plasma distribution on an object to be etched and has improved plasma etch resistance, and a component part, which includes the sintered body, for a plasma processing apparatus.

Sintered Body

To address the above-described aspect, the sintered body according to an embodiment includes boron carbide, in which, in a portion of the sintered body, a volume ratio of grains having a grain size greater than 1 μm and less than or equal to 4 μm is 61% to 86%, based on a total volume of grains on the surface of the sintered body.

The carbon content of the sintered body may be 18 wt % to 30 wt % based on a total weight of the sintered body according to X-ray fluorescence analysis.

The boron carbide of the sintered body may be substantially $B_4C$.

The sintered body is based on the boron carbide and may further include silicon, oxygen, boron oxide, and the like. The materials of the sintered body other than the boron carbide may be present in the form of a secondary phase.

The sintered body may include boron carbide grains, and the boron carbide grains may be also observed on the surface of the sintered body.

The sintered body may have a grain size controlled to a certain level even though the sintered body is prepared by pressure sintering.

In the sintered body, a volume ratio of grains having a grain size greater than 1 μm and less than or equal to 4 μm may be in a range of 61% to 86% or a range of 63% to 83%, based on the total volume of grains on the surface of the sintered body.

In the sintered body, a volume ratio of grains having a grain size of 1 μm or less may be in a range of 1.5% to 15% or a range of 2% to 13.8%, based on the total volume of grains on the surface of the sintered body.

In the sintered body, a volume ratio of grains having a grain size greater than 4 μm relative to total grains may be in a range of 7.2% to 31% or a range of 10.2% to 29%, based on the total volume of grains on the surface of the sintered body.

In the sintered body, a volume ratio of grains having a grain size greater than 4 μm and less than or equal to 5 μm may be in a range of 25% to 43.8% or a range of 27% to 41.8%, based on the total volume of grains on the surface of the sintered body.

In the sintered body, a volume ratio of grains having a grain size greater than 5 μm may be in a range of 7.7% to 12.5% or a range of 8.7% to 10.6%, based on the total volume of grains on the surface of the sintered body.

A porosity of the sintered body may be controlled to 0.5 vol % or less or a relative density thereof may be controlled to 99.5% or more, and a volume ratio of crystal grains having a grain size greater than 1 μm and less than or equal to 4 μm may be in a range of 61% to 86% or a range of 63% to 83%, based on the total volume of grains on the surface of the sintered body.

A porosity of the sintered body may be controlled to 0.5 vol % or less or a relative density thereof may be controlled to 99.5% or more, a volume ratio of crystal grains having a grain size of 1 μm or less may be in a range of 0.5% to 4.5% or a range of 1% to 4%, based on the total volume of grains on the surface of the sintered body.

A porosity of the sintered body may be controlled to 0.5 vol % or less or a relative density thereof may be controlled to 99.5% or more, a volume ratio of crystal grains having a grain size greater than 4 μm may be in a range of 20.8% to 31.3% or a range of 23.5% to 28.7%, based on the total volume of grains on the surface of the sintered body.

A porosity of the sintered body may be controlled to 0.5 vol % or less or a relative density thereof may be controlled to 99.5% or more, a volume ratio of crystal grains having a grain size greater than 4 μm and less than or equal to 5 μm may be in a range of 13.1% to 19.7% or a range of 14.8% to 18%, based on the total volume of grains on the surface of the sintered body.

A porosity of the sintered body may be controlled to 0.5 vol % or less or a relative density thereof may be controlled to 99.5% or more, a volume ratio of crystal grains having a grain size greater than 5 μm may be in a range of 5% to 13% or a range of 7.7% to 11.6%, based on the total volume of grains on the surface of the sintered body.

The sintered body may have an average grain size of 1 μm to 5 μm or 1.5 μm to 4.5 μm.

An analysis of a grain size of the sintered body may be performed by a method used in experimental examples described below or based on a result of observing the surface of the sintered body.

The sintered body having the above characteristics has high densification, low porosity, and a relatively uniform grain size distribution, and thus may exhibit good physical properties and ensure excellent plasma etch resistance. In addition, plasma etch resistance may be stably maintained.

The sintered body may have a purity of 97% or more or 98.1% or more, based on boron B and carbon C.

The purity is evaluated based on weight according to X-ray fluorescence analysis (XRF).

The sintered body may have a carbon content of 18 wt % to 30 wt % or 19 wt % to 28 wt % based on the total weight of the sintered body according to X-ray fluorescence analysis (XRF). The sintered body may not additionally include carbon in the stoichiometric carbon content of boron carbide ($B_4C$).

The sintered body may have a boron content of about 70 wt % to 80 wt % or about 73 wt % to 79 wt % based on the total weight of the sintered body according to X-ray fluorescence analysis.

The sintered body may have an oxygen content of about 0.1 wt % to 1.2 wt % or about 0.2 wt % to 1 wt % based on the total weight of the sintered body according to X-ray fluorescence analysis.

The sintered body may have a silicon content of about 0.1 wt % to 1 wt % or about 0.2 wt % to 0.8 wt % based on the total weight of the sintered body according to X-ray fluorescence analysis.

The densification of the sintered body may be greatly improved due to the content of these other elements.

The sintered body may contain metallic impurities of 400 ppm or less or 200 ppm or less. The metallic impurities may include sodium, aluminum, calcium, iron, nickel, and the like.

The sintered body may have a flexural strength of 381 MPa to 571 MPa or 428 MPa to 524 MPa.

The sintered body may have a Vickers hardness of 26 GPa to 39 GPa or 29 GPa to 36 GPa.

The sintered body may have a thermal conductivity of 18.4 W/mK to 27.6 W/mK or 21 W/mK to 25 W/mK.

The sintered body having the above characteristics may exhibit good reliability and durability when applied as a component of a plasma processing apparatus and help maintain plasma etch resistance.

An etch rate of the sintered body may be 2% or less according to Equation 1 below under plasma etching conditions, i.e., when a pressure of a chamber is 100 mTorr, plasma power is 800 W, a plasma exposure time is 300 minutes, a flow rate of $CF_4$ gas in the chamber is 50 sccm, a flow rate of Ar gas is 100 sccm, and a flow rate of 02 gas is 20 sccm:

Etch rate={(thickness of the sintered body before etching-thickness of the sintered body after etching)/(thickness of the sintered body after etching)}×100% [Equation 1]

The etching rate of the sintered body may be 2% or less, 1.7% or less, 1.45% or less, or 1.4% or less. The etch rate may be 0.1% or more.

The sintered body has such plasma etch resistance and coarse grain characteristics to maximally suppress the generation of particles in a plasma treatment process.

An etch rate of the sintered body may be at least 20% or at least 32% less than that of silicon carbide prepared by chemical vapor deposition (CVD) according to the above-described plasma etching conditions.

The sintering body may have a relative density of 95% or more, 97% or more, or 99% or more. The relative density may be 99.9% or less. The sintered body may have an excellent relative density while exhibiting a relatively uniform and controlled grain size. The relative density is a relative density of the sintered body converted into a percentage when a completely dense state is 100%.

Component Part

To achieve the above-described object, the component part according to an embodiment may include the sintered body, and may be disposed inside a plasma processing apparatus.

The sintered body may be included as a part of a surface of the component part that may be exposed to plasma or as an entire surface of the component part.

The sintered body may be included on the surface of the sintered body, and another ceramic material (silicon carbide, silicon or the like) may be included inside the surface of the sintered body.

The component part may be a component part that may affect the flow of plasma ions in a plasma etching process, and may be, for example, a focus ring or the like. The focus ring may be applied as a support for supporting edges of a wafer when the wafer is disposed in the plasma processing apparatus.

The component part may include the sintered body to secure high plasma etch resistance, reduce the frequency of replacing the component part, and effectively suppress the generation of particles that may have a negative effect on yield.

Method of Preparing Sintered Body

To achieve the above-described object, the method of preparing a sintered body of an embodiment may include: a carbonization operation of charging a raw material composition in a mold and molding the same to prepare a molding result, and carbonizing the molding result at a temperature of 500° C. to 1000° C.; a first sintering operation of performing a thermal process at a temperature of 1900° C. to 2100° C. after the carbonization operation; and a second sintering operation of performing a thermal process at a temperature of 2000° C. to 2230° C. after the first sintering operation.

The raw material composition may include boron carbide and a sintering enhancer.

The first sintering operation and the second sintering operation may be performed at a pressure of 25 MPa to 60 MPa, respectively.

The raw material composition may be raw material granules obtained by spray-drying a raw material slurry including boron carbide, a sintering enhancer, and a solvent.

The boron carbide included in the raw material composition may be in the form of a powder, and may be a powder with a purity of 98 wt % or more of boron and carbon relative to the total weight of the powder.

The raw material composition may further include a carbon-based material, and the carbon-based material may be a polymer resin or a carbonized polymer resin. For example, the raw material composition may be a phenolic resin, a polyvinyl alcohol resin or the like.

The sintering enhancer of the raw material composition may include boron oxide, a binder, and the like, and the binder may include an acrylic resin.

The solvent included in the raw material composition may include water, an alcohol-based material, and the like, and may be contained in an amount of 60 vol % to 80 vol % based on the total volume of the raw material slurry.

The raw material slurry may be prepared by a stirring process using a ball mill or the like, and the stirring process using a ball mill may be performed using a polymer ball or the like for 5 to 20 hours.

The molding result may be obtained by injecting a raw material into a mold and pressing the same and applying cold isostatic pressing (CIP) or the like. Here, pressure may be 100 MPa to 200 MPa.

The mold may be a carbon mold.

A processing process may be performed to remove unnecessary portions of the molding result.

In the first sintering operation, the temperature may be in a range of 1900° C. to 2100° C. or 1950° C. to 2050° C.

In the second sintering operation, the temperature may be in a range of 2000° C. to 2230° C. or 2080° C. to 2180° C.

The temperature in the second sintering operation may be higher than that in the first sintering operation. A sintered body with more uniform grain characteristics and mechanical properties may be obtained by applying the above temperatures.

The temperature rise to the temperature of the thermal process in the first sintering operation may proceed for 10 hours to 15 hours.

The first sintering operation may be performed for 0.5 hours to 2 hours

The temperature rise to the temperature of the thermal process in the second sintering operation may proceed for 2 hours to 5 hours.

The second sintering operation may be performed for 0.5 hours to 3 hours.

After the second sintering operation, a cooling operation to room temperature may be performed for 10 hours to 15 hours.

Through the above sintering operations, a sintered body with substantially uniform and controlled grains may be prepared and high densification may be achieved.

Additionally, shape processing may be applied to the sintered body obtained by the second sintering operation.

In the first sintering operation, a temperature increase rate may be applied to reach the temperature of the thermal process, and the temperature increase rate may be in a range of 1° C./min to 10° C./min or a range of 2° C./min to 5° C./min.

In the second sintering operation, a temperature increase rate may be applied to reach the temperature of the thermal process, and the temperature increase rate may be in a range of 0.1° C./min to 5° C./min or a range of 0.2° C./min to 1° C./min.

A temperature decrease rate may be applied in the cooling operation after the second sintering operation, and the temperature decrease rate may be in a range of −10° C./min to −1° C./min or a range of −5° C./min to −2° C./min.

The first sintering operation and the second sintering operation may be performed at a pressure of 25 MPa to 60 MPa or a pressure of 30 MPa to 50 MPa, respectively. Here, the pressure in the second sintering operation may be higher than that in the first sintering operation. By applying the above pressure, high densification of the sintered body may be achieved.

Hereinafter, the present disclosure will be described in more detail through specific examples. The examples below are merely intended to help understanding of the present disclosure, and the scope of the present disclosure is not limited thereto.

Example 1—Preparation of Sintered Body 1

A raw material slurry was prepared by putting a composition containing a mixture of 14 parts by volume of boron carbide powder of China Abrasive and 70 parts by volume of an ethanol solvent. Additionally, 2 parts by weight of an acrylic binder based on 100 parts by weight of the mixture of the powder and solvent were added into a mixer and mixed using a ball mill. Raw material granules were obtained by spray-drying the raw material slurry through a nozzle, and a carbon mold of a pressure sintering device was filled with the raw material granules. A carbonization operation was performed by performing a thermal process on the carbon mold filled with the raw material granules at 800° C. Next, the temperature was raised to 1900° C. by a temperature increase rate of 3° C./min and then the first sintering operation was performed for 1 hour at 1900° C. and under a pressure of 30 MPa. Next, the temperature was raised to 2000° C. at a temperature increase rate of 0.5° C./min, and then the second sintering operation was performed for 0.5 hours at 2000° C. under a pressure of 35 MPa. Thereafter, a cooling operation to room temperature (25° C.) was performed at a rate of 3° C./min to prepare a sintered body with a relative density of 95%.

Example 2—Preparation of Sintered Body 2

The conditions of the second sintering operation in Example 1 were changed to 2100° C., 35 MPa, and 1 hour to prepare a sintered body with a relative density of 97%.

Example 3—Preparation of Sintered Body 3

The conditions of the second sintering operation in Example 1 were changed to 2130° C., 40 MPa, and 1.5 hours to prepare a sintered body with a relative density of 99.9%.

Comparative Example 1—Chemical Vapor Deposition

Silicon carbide of KNJ was prepared by chemical vapor deposition (CVD).

The Examples and Comparative Example described above are briefly shown in Table 1.

TABLE 1

| Classification | First sintering operation conditions | Second sintering operation temperature | Second sintering operation pressure | Second sintering operation time | Remarks |
|---|---|---|---|---|---|
| Example 1 | Temperature: 1900° C. Pressure: 30 MPa Time: 1 hour | 2000° C. | 35 MPa | 0.5 hours | Relative density 95% |
| Example 2 | Same as Example 1 | 2100° C. | 35 MPa | 1 hour | Relative density 97% |
| Example 3 | Same as Example 1 | 2130° C. | 40 MPa | 1.5 hours | Relative density 99.9% |
| Comparative Example 1 | — | — | — | — | CVD-SiC |

Experimental Example—Analysis on Grains and Composition Through Electrolytic Etching of Sintered Body Electrolytic etching was performed on the sintered body, which was prepared according to Example 1 and Example 3, under conditions of a 2 vol % KOH solution, a flow rate of 12 to 20 sccm, a time of 5 seconds, and a voltage of 40 to 51 V and then ultrasonic cleaning was performed for 20 minutes. Surface positions in three random regions of the surface of the sintered body before and after the electrolytic etching were photographed at 5000× magnification using a scanning electron microscope (SEM), a volume ratio by grain size was analyzed, compositions according to some positions A, B, C, D, and E before and after the electrolytic etching were analyzed, and analysis results are shown in FIGS. 4A to 5B and Tables 2 to 6.

TABLE 2

| Grain size (μm) | Example 1 volume ratio (%) | Example 3 volume ratio (%) |
|---|---|---|
| 1 or less | 10.97 | 2.52 |
| greater than 1 and less than or equal to 2 | 34.37 | 17.16 |
| greater than 2 and less than or equal to 3 | 24.59 | 31.82 |
| greater than 3 and less than or equal to 4 | 17.84 | 22.44 |
| greater than 4 and less than or equal to 5 | 12.23 | 16.41 |
| greater than 5 and less than or equal to 6 | 0 | 9.64 |

TABLE 3

| Element | Example 1 Composition (wt %) at position A | Example 1 Composition (wt %) at position B | Example 1 Composition (wt %) at position C |
|---|---|---|---|
| B | — | 67.64 | 75.82 |
| C | 2.42 | 26.59 | 24.18 |
| O | 9.67 | — | — |
| Si | 13.10 | 5.76 | — |
| Sn | 74.81 | — | — |

TABLE 4

| Element | Example 1 Composition (wt %) at position D | Example 1 Composition (wt %) at position E |
|---|---|---|
| B | 19.66 | 77.44 |
| C | 11.79 | 22.56 |
| O | 12.36 | — |
| Sn | 56.19 | — |

TABLE 5

| Element | Example 3 Composition (wt %) at position A | Example 3 Composition (wt %) at position B |
|---|---|---|
| B | — | 69.9 |
| C | 18.29 | 30.1 |
| Si | 81.71 | — |

TABLE 6

| Element | Example 3 Composition (wt %) at position C | Example 3 Composition (wt %) at position D |
|---|---|---|
| B | — | 21.86 |
| C | 19.63 | 78.14 |
| Si | 80.37 | — |

Figure 1B:
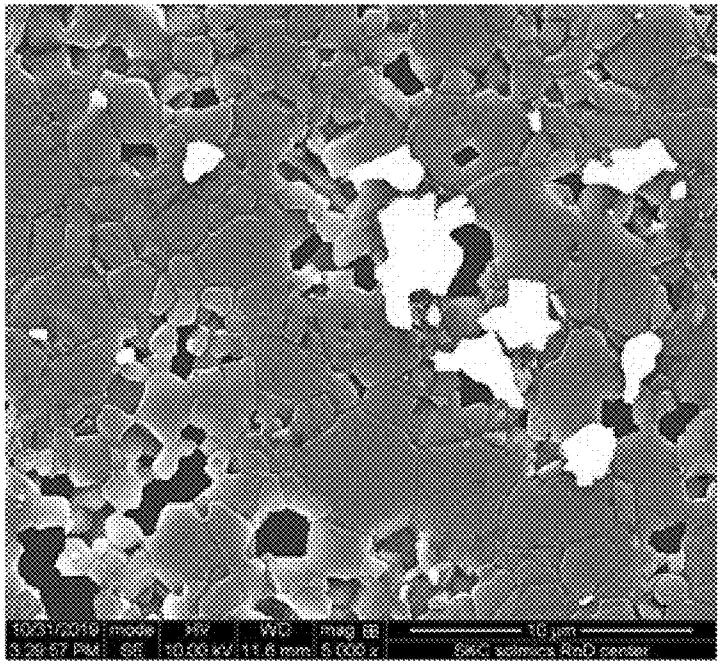
FIG. 1B illustrates the surface of the sintered body of Example 1 after electrolytic etching.
Figure 1C:
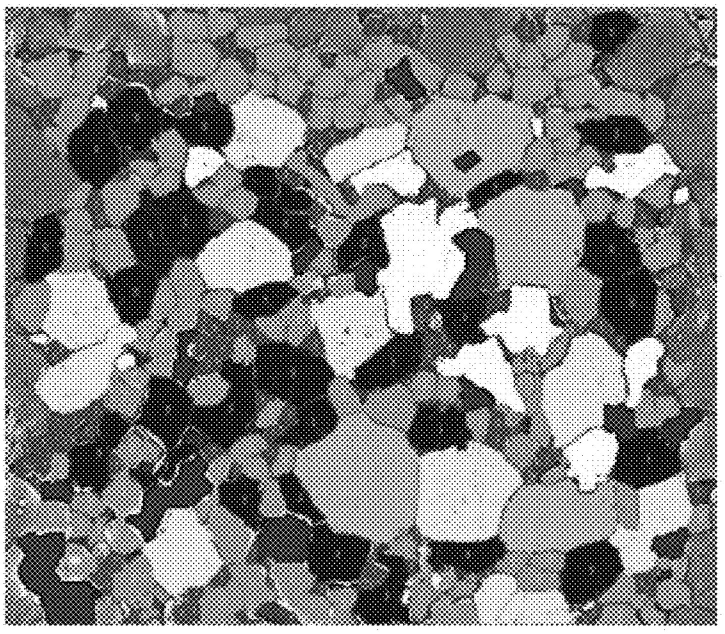
FIG. 1C illustrates identifiable grains of the surface of the sintered body of Example 1, which are displayed in different colors, after electrolytic etching.

FIG. 1A illustrates the surface of the sintered body of Example 1 before electrolytic etching. FIG. 1B illustrates the surface of the sintered body of Example 1 after electrolytic etching. FIG. 10 illustrates identifiable grains on the surface of the sintered body of Example 1 after electrolytic etching, which are displayed in different colors. Red color represents grains having a grain size of 1 μm or less, yellowish green color represents grains with a grain size of greater than 1 μm and less than or equal to 2 μm, blue color represents grains with a grain size of greater than 2 μm and less than or equal to 3 μm, yellow color represents grains with a grain size of greater than 3 μm and less than or equal to 4 μm, azure color represents grains with a grain size of greater than 4 μm and less than or equal to 5 μm, and purple color represents grains with a grain size of greater than 5 μm and less than or equal to 6 μm.

Figure 2A:
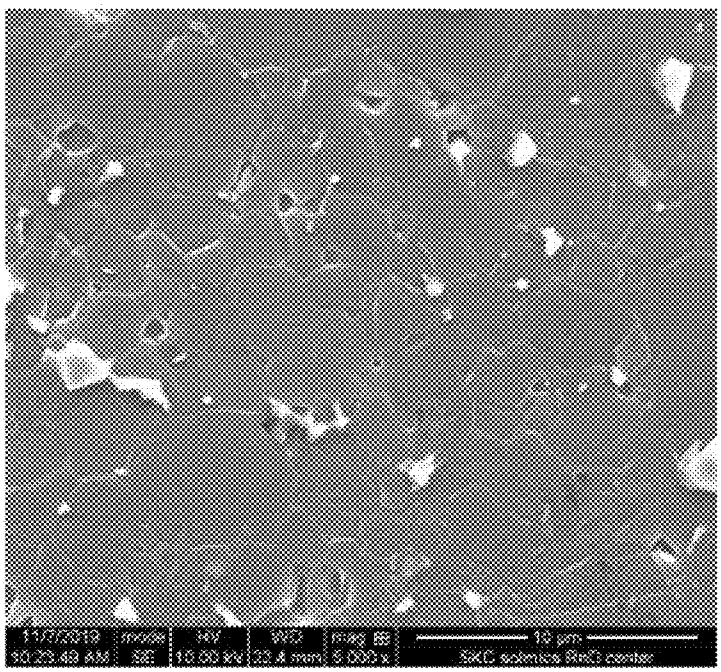
FIG. 2A illustrates a surface of a sintered body of Example 3 before electrolytic etching.
Figure 2B:
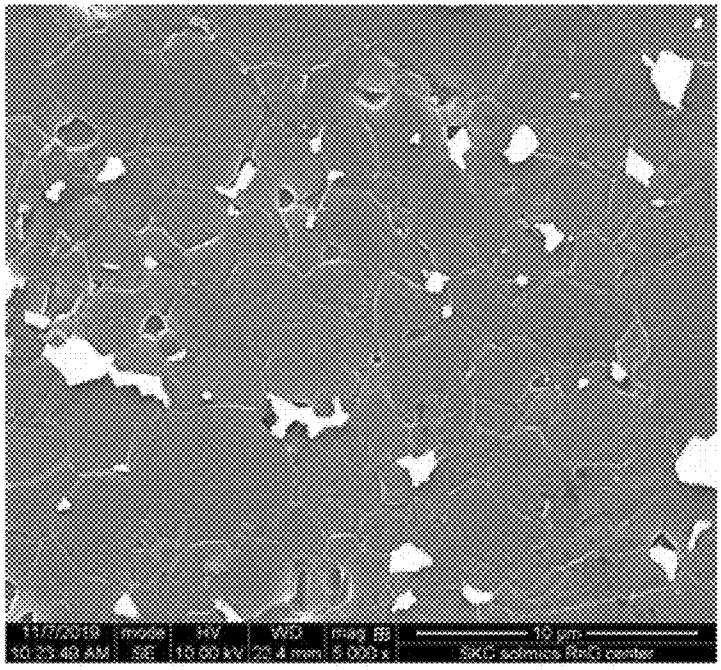
FIG. 2B illustrates the surface of the sintered body of Example 3 after electrolytic etching.
Figure 2C:
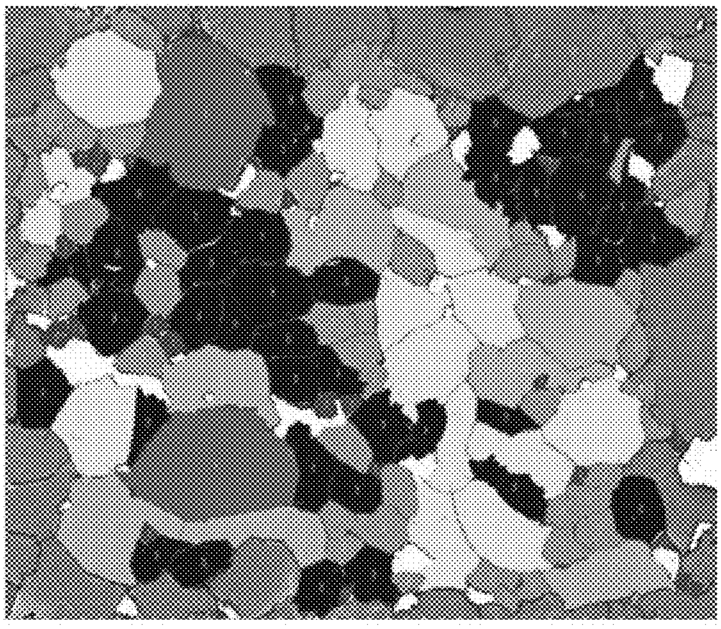
FIG. 2C illustrates identifiable grains of the surface of the sintered body of Example 3, which are displayed in different colors, after electrolytic etching.

FIG. 2A illustrates the surface of the sintered body of Example 3 before electrolytic etching. FIG. 2B illustrates the surface of the sintered body of Example 3 after electrolytic etching. FIG. 2C illustrates identifiable grains on the surface of the sintered body of Example 3 after electrolytic etching, which are displayed in different colors. Color classification is based on the conditions described above.

Figure 4A:
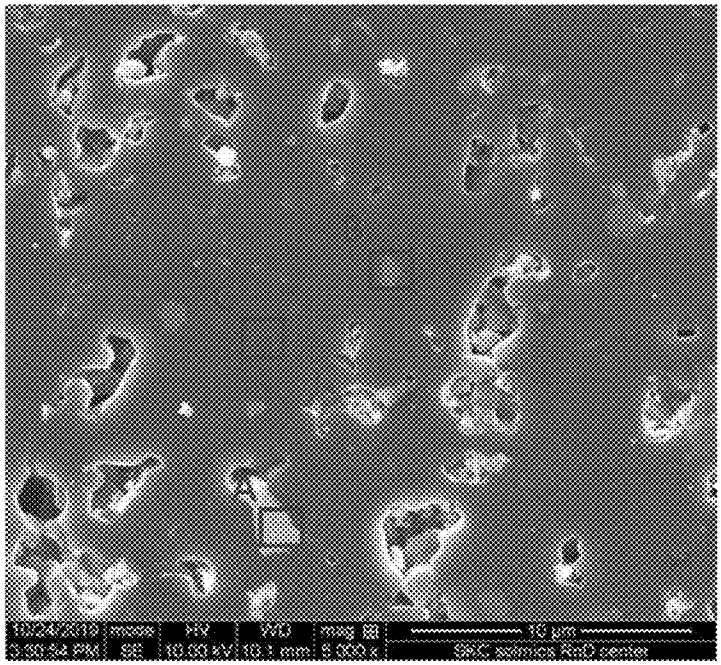
FIG. 4A illustrates the surface of the sintered body of Example 1 before electrolytic etching and composition measurement points thereon.
Figure 4B:
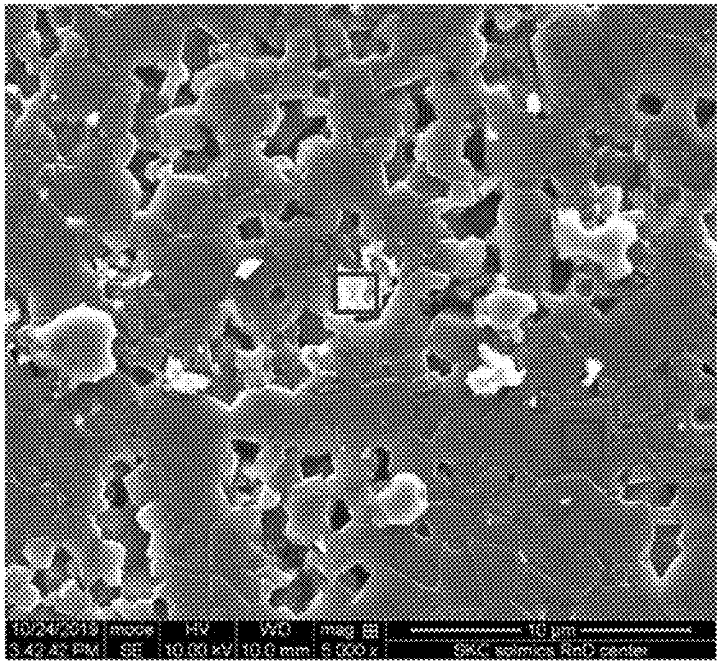
FIG. 4B illustrates the surface of the sintered body of Example 1 after electrolytic etching and composition measurement points thereon.

FIG. 4A illustrates the surface of the sintered body of Example 1 before electrolytic etching and composition measurement positions thereon. FIG. 4B illustrates the surface of the sintered body of Example 1 after electrolytic etching and composition measurement positions thereon.

Figure 5A:
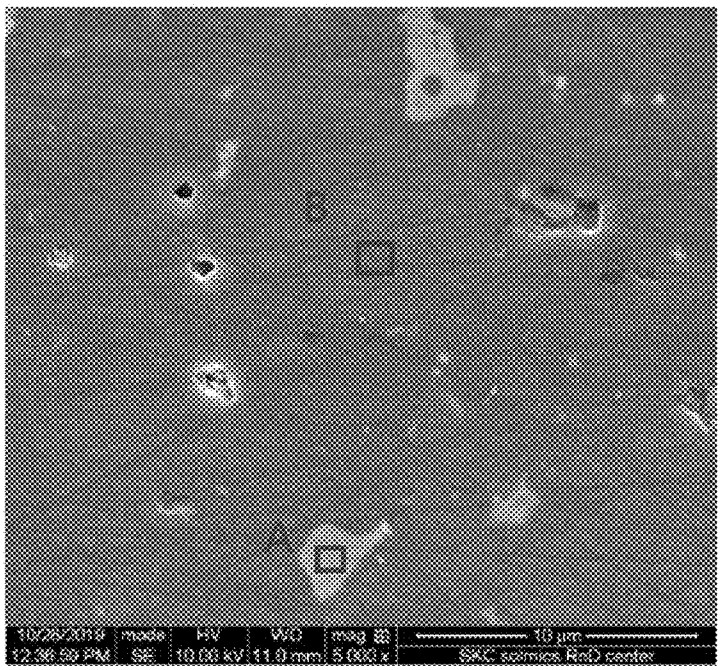
FIG. 5A illustrates the surface of the sintered body of Example 3 before electrolytic etching and composition measurement points thereon.
Figure 5B:
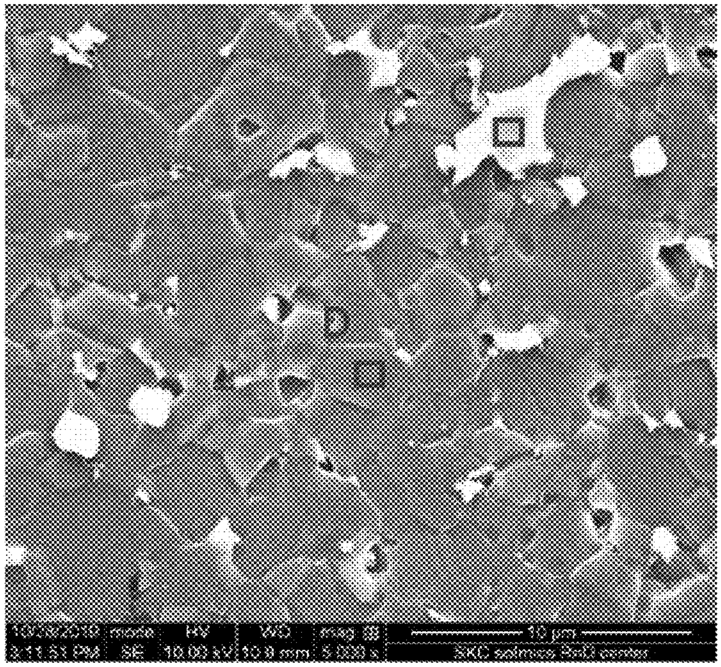
FIG. 5B illustrates the surface of the sintered body of Example 3 after electrolytic etching and composition measurement points thereon.

FIG. 5A illustrates the surface of the sintered body of Example 3 before electrolytic etching and composition measurement positions thereon. FIG. 5B illustrates the surface of the sintered body of Example 3 after electrolytic etching and composition measurement positions thereon.

Referring to Table 2 and FIGS. 1A to 10 and 2A to 2C, it can be seen that the sintered bodies of Examples 1 and 3 have a substantially uniform distribution of grains of several micrometers and include almost no grains having a grain size exceeding 6 μm or less than or equal to 1 μm.

Referring to Tables 3 to 6, FIGS. 4A to 4B and FIGS. 5A to 5E, it can be seen that not only boron carbide but also oxygen, silicon, tin, and the like are found on the surface of the sintered body of Example 1 before and after electrolytic etching, and not only boron carbide but also silicon and the like are found on the surface of the sintered body of Example 3 before and after electrolytic etching.

Experimental Example—X-Ray Fluorescence Analysis (XRF)

X-ray fluorescence spectroscopy (XRF) was conducted on the samples of Example 3 and Comparative Example 1 by Rigaku's ZSX Primus, and results are shown in Table 7.

TABLE 7

| Element | Example 3 (wt %) | Comparative Example 1 (wt %) |
|---|---|---|
| Carbon and boron (purity) | 98.1579 | — |
| B | 78.075 | — |
| C | 20.0829 | 42.225 |
| O | 0.8442 | — |
| Na | — | — |
| Mg | 0.0043 | — |
| Al | 0.2932 | — |
| Si | 0.6104 | 57.775 |
| P | 0.0033 | — |
| S | 0.0016 | — |
| Ca | 0.015 | — |
| Ti | 0.0039 | — |
| Cr | 0.0064 | — |
| Mn | 0.0011 | — |
| Fe | 0.0539 | — |
| Ni | 0.0047 | — |

TABLE 7-continued

| Element | Example 3 (wt %) | Comparative Example 1 (wt %) |
|---|---|---|
| Ge | — | — |
| Y | — | — |
| Ba | — | — |

Referring to Table 7, it can be seen that the sintered body of Example 3 includes about 78.1 wt % boron and 20.1 wt % carbon, and includes oxygen, silicon, and the like.

Experimental Example—Measurement of Plasma Etch Rate

Plasma etching rates of samples of the sintered bodies of Examples 1 to 3 and Comparative Example 1 were measured under the following conditions, and measurement results are shown in Table 8 and FIGS. 3A to 3D, 6A to 6F, and 7A to 7B.

Plasma Etching Conditions

Figure 3A:
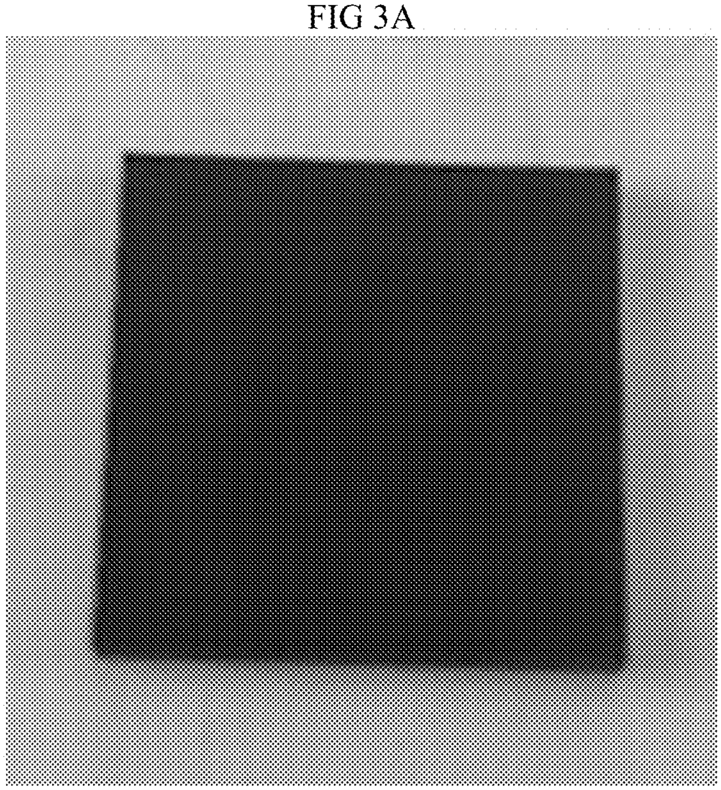
FIGS. 3A to 3C are photographs of samples of Examples 1 to 3 sequentially taken after plasma etching, respectively.
Figure 3B:
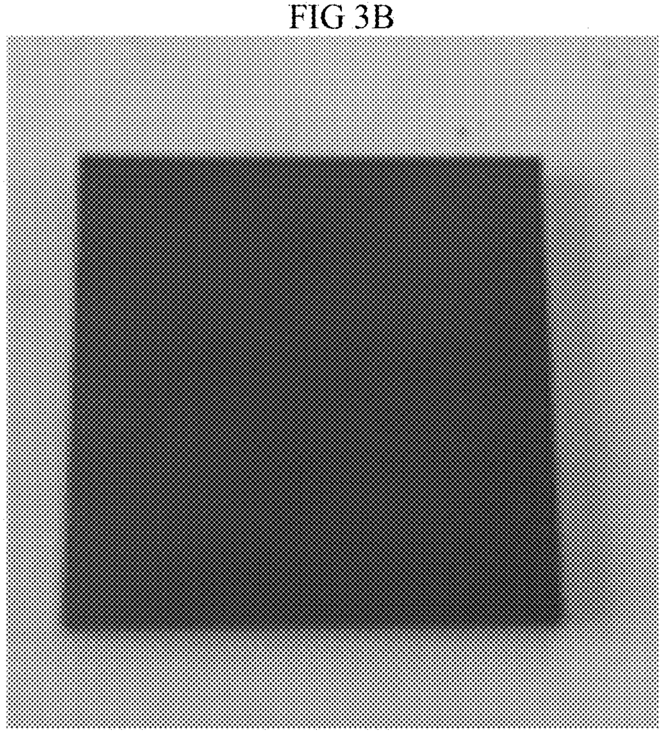
Figure 3C:
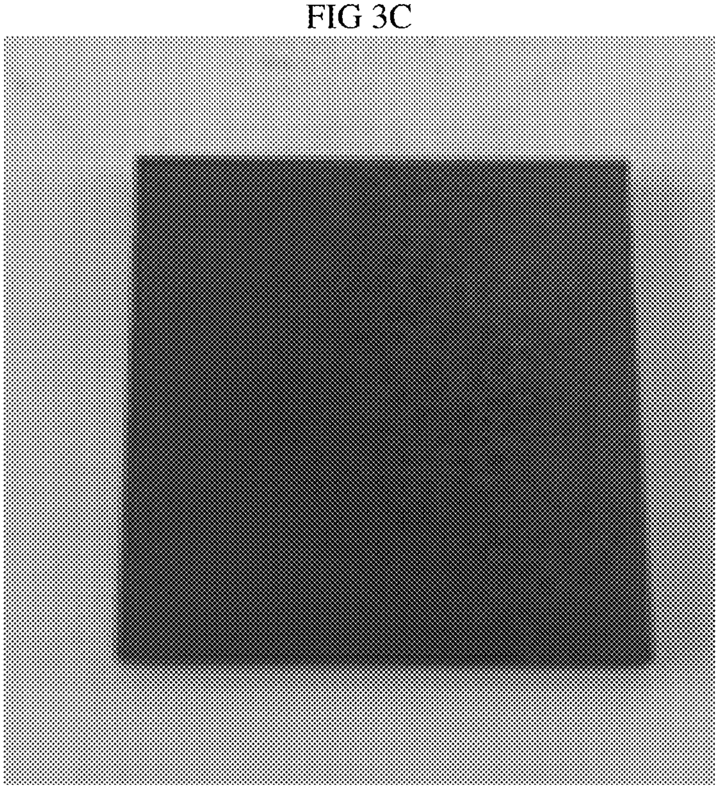
Figure 3D:
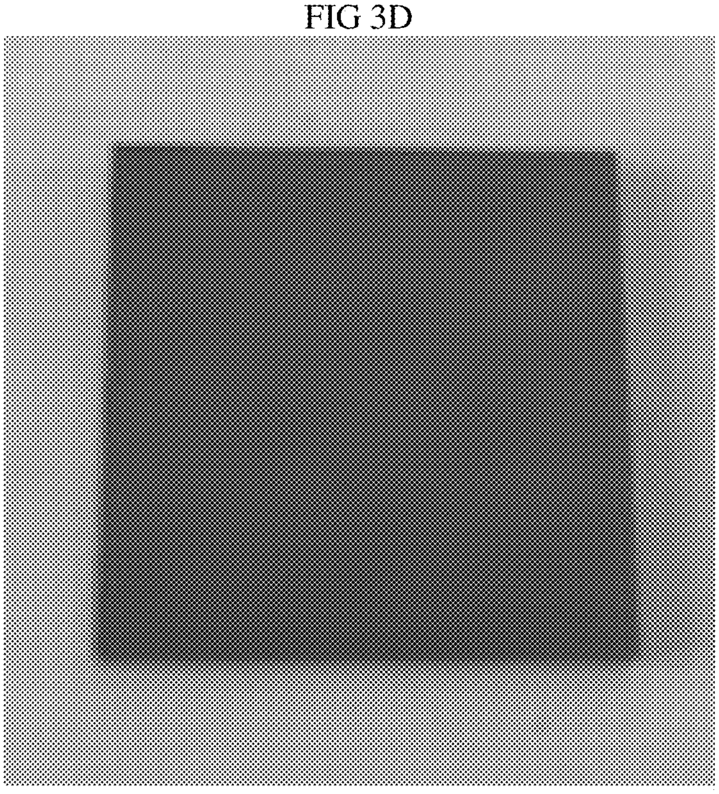
FIG. 3D illustrates a sample of Comparative Example 1 after plasma etching.

Chamber pressure: 100 mTorr, plasma power: 800 W, exposure time: 300 minutes, $CF_4$ gas flow rate: 50 sccm, Ar gas flow rate: 100 sccm, and $O_2$ gas flow rate: 20 sccm FIGS. 3A to 3C illustrate photographs of samples of Examples 1 to 3 sequentially taken after plasma etching, respectively, and FIG. 3D illustrates a photograph of a sample of Comparative Example 1 taken after plasma etching.

Figure 6A:
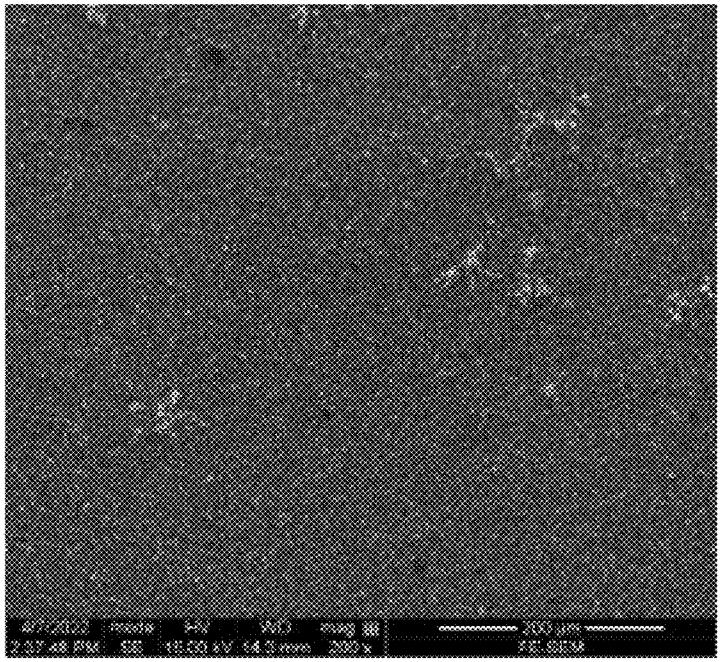
FIGS. 6A to 6C illustrate surface states of the sintered bodies of Examples 1 to 3 before plasma etching, respectively.
Figure 6B:
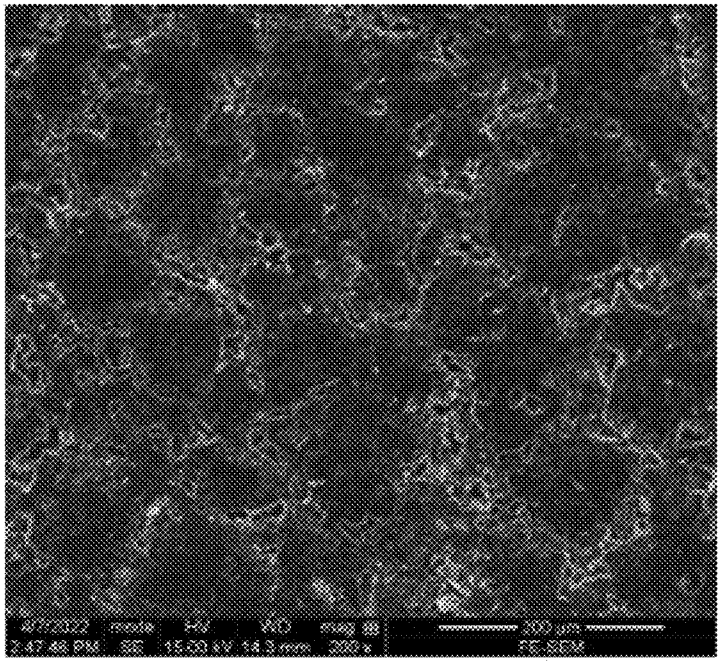
Figure 6C:
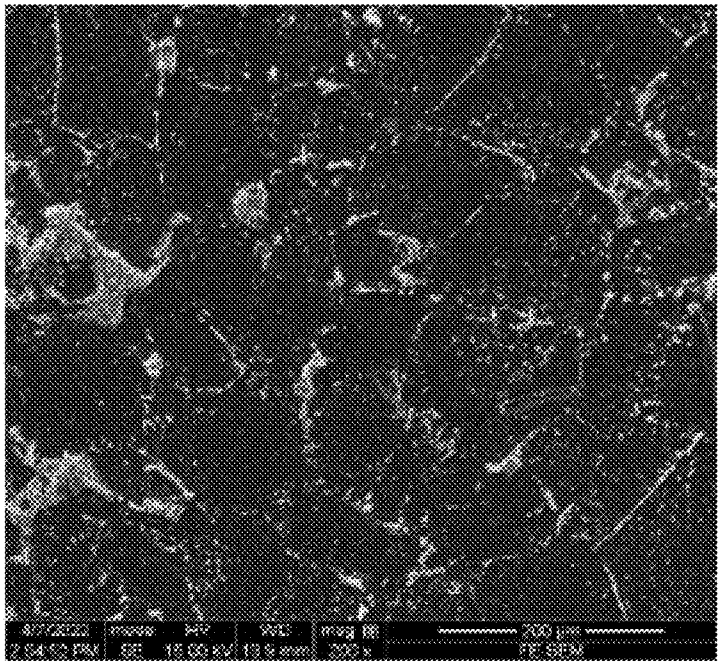
Figure 6D:
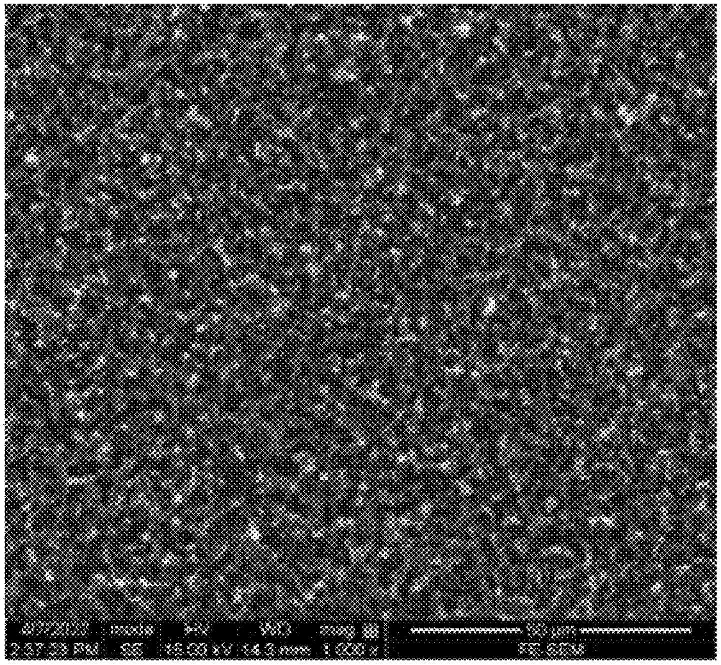
FIGS. 6D to 6F illustrate surface states of the sintered bodies of Examples 1 to 3 after plasma etching, respectively.
Figure 6E:
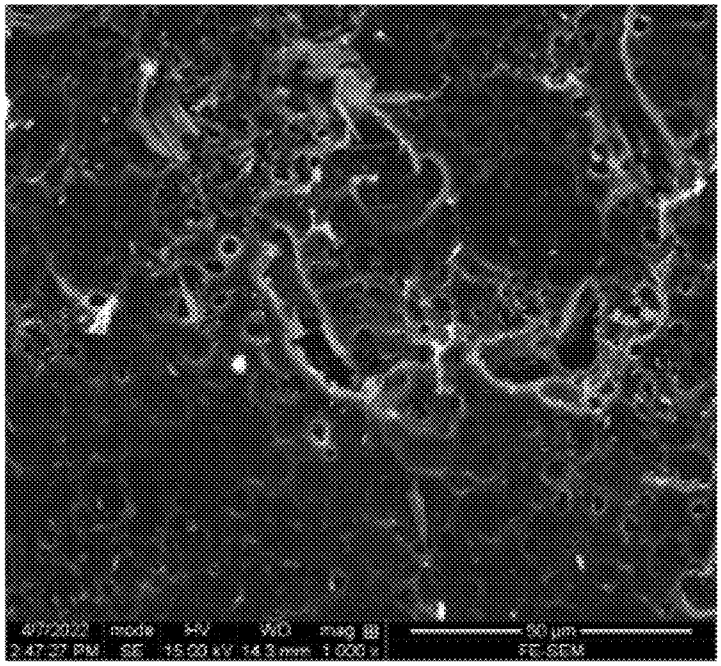
Figure 6F:
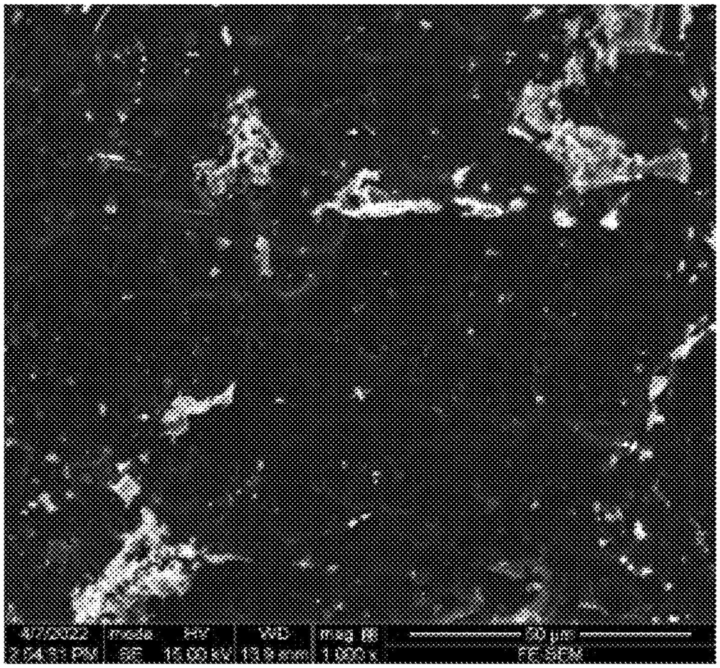

FIGS. 6A to 6C illustrate surface states of Examples 1 to 3 before plasma etching, respectively, and FIGS. 6D to 6F illustrate surface states of Examples 1 to 3 after plasma etching, respectively.

Figure 7A:
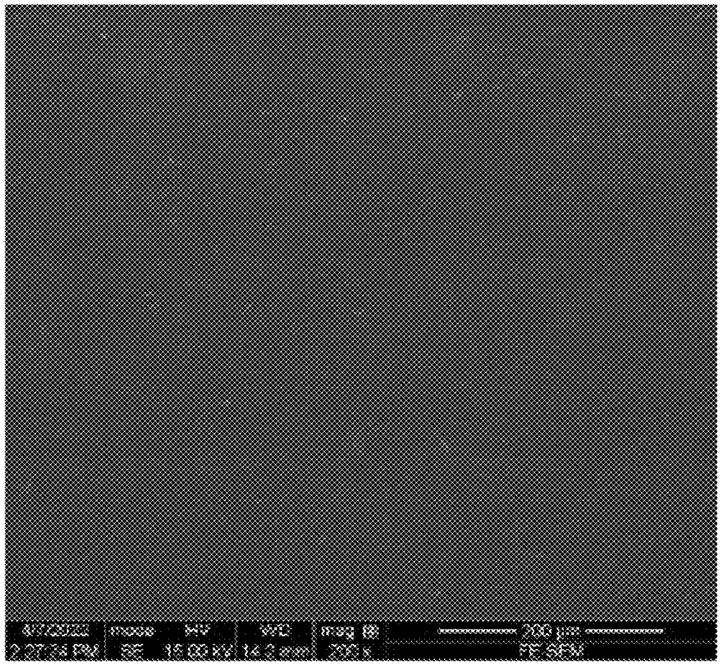
FIG. 7A illustrates a surface state of Comparative Example 1 before plasma etching.
Figure 7B:
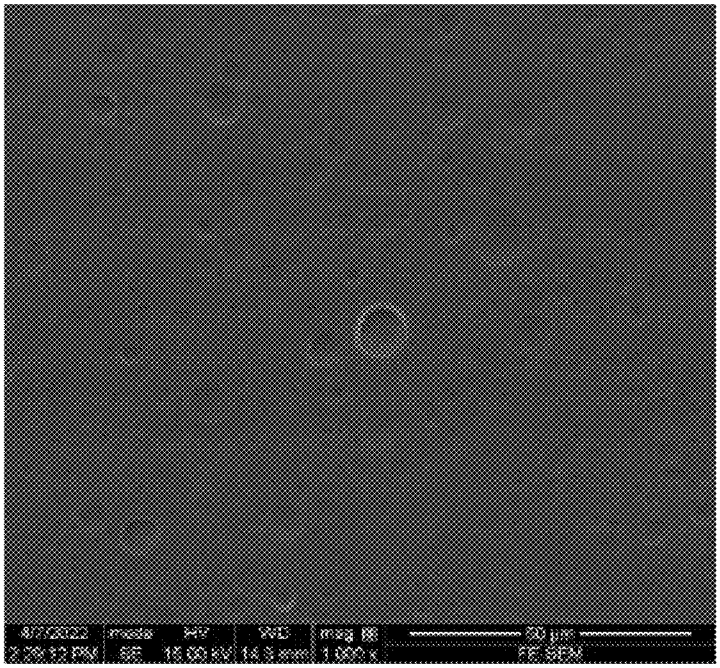
FIG. 7B illustrates a surface state of Comparative Example 1 after plasma etching.

FIG. 7A illustrates the surface of Comparative Example 1 before plasma etching. FIG. 7B illustrates the surface of Comparative example 1 after plasma etching.

TABLE 8

| Classification | Example 1 | Example 2 | Example 3 | Comparative Example 1 |
|---|---|---|---|---|
| Thickness (mm) before etching | 2.0014 | 2.0026 | 2.005 | 1.9962 |
| Thickness (mm) after etching | 1.9738 | 1.975 | 1.9734 | 1.9532 |
| Etching amount (mm) | 0.0276 | 0.0276 | 0.0316 | 0.043 |
| Etch rate (%)* thickness reduction rate (%) | 1.38 | 1.38 | 1.58 | 2.15 |

*Etch rate={(thickness of the sintered body before etching-thickness of the sintered body after etching)/(thickness of the sintered body after etching)}×100%

Referring to Table 8, it can be seen that Examples 1 to 3 are superior to silicon carbide prepared by CVD in terms of plasma etch resistance.

The sintered body according to an embodiment has high densification, low porosity, and a substantially uniform grain size distribution and thus may exhibit good physical properties and ensure excellent plasma etch resistance. In addition, plasma etch resistance can be stably maintained.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sintered body comprising boron carbide, wherein a volume ratio of grains of the boron carbide having a grain size greater than 1 μm and less than or equal to 4 μm is 61% to 86% based on a total volume of grains present on a surface of the sintered body, wherein an etch rate of the sintered body according to Equation 1 below is 2% or less under plasma etching conditions in which a pressure of a chamber is 100 mTorr, a plasma power is 800 W, a plasma exposure time is 300 minutes, a flow rate of $CF_4$ gas in the chamber is 50 sccm, a flow rate of Ar gas is 100 sccm, and a flow rate of $O_2$ gas is 20 sccm:

Etch rate={(thickness of the sintered body before etching-thickness of the sintered body after etching)/(thickness of the sintered body after etching)}×100% [Equation 1]

wherein a volume ratio of grains of the boron carbide having a grain size of 1 μm or less is in a range of 1.5% to 15% based on the total volume of the grains present on the surface of the sintered body, and wherein a volume ratio of grains of the boron carbide having a grain size greater than 4 μm is in a range of 7.2% to 31% based on the total volume of the grains present on the surface of the sintered body.

2. The sintered body of claim 1, wherein a carbon content of the sintered body is 18 wt % to 30 wt % based on a total weight of the sintered body according to an X-ray fluorescence analysis.

3. The sintered body of claim 1, wherein a porosity of the sintered body is 5 vol % or less.

4. The sintered body of claim 1, wherein the sintered body has an average grain size of 2 μm to 5 μm.

5. The sintered body of claim 1, wherein a porosity of the sintered body is 0.5 vol % or less.

6. The sintered body of claim 1, wherein a content of boron and carbon is 97 wt % or more.

7. The sintered body of claim 1, wherein the sintered body has a thermal conductivity of 18 W/mK to 33 W/mK at 25° C.

8. A method of preparing a sintered body comprising:

charging a raw material composition in a mold, molding the raw material composition, and carbonizing the molded raw material at a temperature of 500° C. to 1000° C.;

a first sintering of performing a first thermal process at a temperature of 1900° C. to 2100° C. after the carbonizing; and a second sintering of performing a second thermal process at a temperature of 2000° C. to 2230° C. after the first sintering, wherein the first sintering and the second sintering are performed at a pressure of 25 MPa to 60 MPa, respectively.

9. The method of claim 8, wherein the raw material composition comprises boron carbide and a sintering enhancer.

10. The method of claim 8, wherein the raw material composition is raw material granules obtained by spray-drying a raw material slurry comprising boron carbide, a sintering enhancer, and a solvent.

11. A component part disposed inside a plasma processing apparatus comprising the sintered body of claim 1.

* * * * *